No. 865,143.　　　　　　　　　　　　　　PATENTED SEPT. 3, 1907.
G. R. WILLIAMS.
VEHICLE WHEEL.
APPLICATION FILED AUG. 22, 1906.

WITNESSES

INVENTOR
George R. Williams
BY
ATTORNEYS

UNITED STATES PATENT OFFICE.

GEORGE RAINEY WILLIAMS, OF LITTLE ROCK, ARKANSAS.

VEHICLE-WHEEL.

No. 865,143.  Specification of Letters Patent.  Patented Sept. 3, 1907.

Application filed August 22, 1906. Serial No. 331,588.

*To all whom it may concern:*

Be it known that I, GEORGE RAINEY WILLIAMS, a citizen of the United States, and a resident of Little Rock, in the county of Pulaski and State of Arkansas, have invented a new and Improved Vehicle-Wheel, of which the following is a full, clear, and exact description.

This invention relates to wheels of vehicles, and is especially useful as a wheel for automobiles.

The object of the invention is to produce a wheel of simple construction, which will have a high degree of resiliency, so as to reduce the jars and shocks incident to passing over a rough roadway.

A feature of the invention is the absence of a pneumatic tire, the general purpose being to avoid the delays usually incident to puncturing such tires.

The invention consists in the construction and combination of the parts to be more fully described hereinafter and particulary set forth in the claims.

Reference is to be had to the accompanying drawings forming a part of this specification, in which similar characters of reference indicate corresponding parts in both figures.

Figure 1:
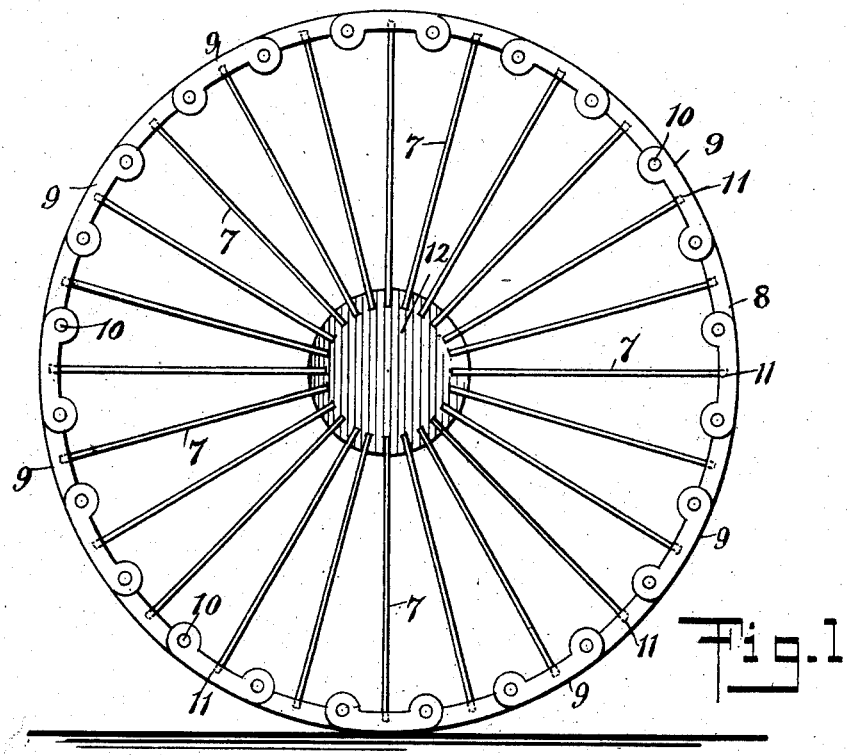
Figure 2:
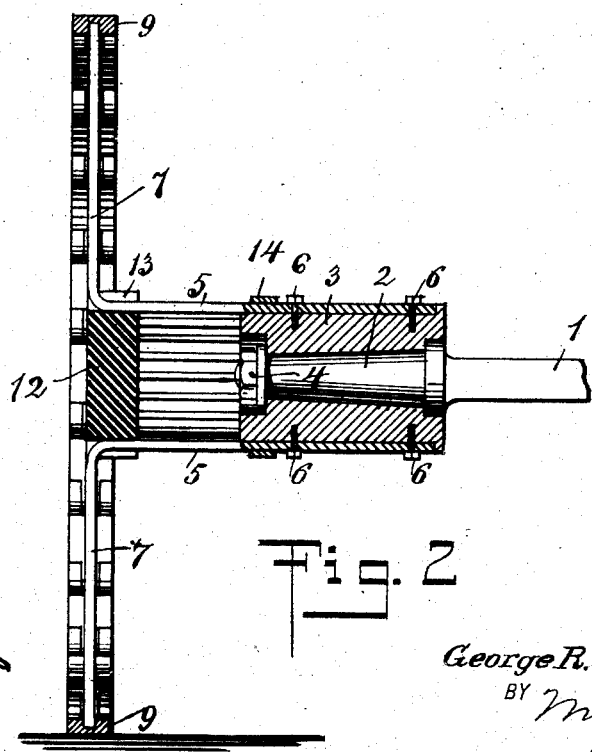

Figure 1 is a side elevation of a wheel constructed according to my invention; and Fig. 2 is a vertical central section through the wheel, taken longitudinally of the axis thereof.

Referring more particularly to the parts, 1 represents a portion of an axle, the end of which is formed into a spindle 2 of common construction. My wheel comprises a hub 3, to which is attached a plurality of bars 5, which extend longitudinally of the hub and project a considerable distance beyond the outer face thereof, as shown in Fig. 2. These bars are attached to the outer face of the hub by means of suitable bolts 6, as indicated in Fig. 2. For use on an ordinary vehicle, the hub is rotatably mounted upon the spindle 3 and secured in position by a hub-nut 4, in the usual manner. For use on automobiles, the hub may or may not be rotatably mounted upon the spindle, according to the service to be performed.

The outer portions of the bars 5 are bent outwardly in a radial direction from the axis of the wheel, so that the bars constitute spokes 7, and to the outer extremities of these spokes a felly or rim 8 is attached. These radial spoke-extremities, stand separately at a certain distance from the axis, and it will be necessary, when placing the encircling rim, or felly, into position, to press them inward, or toward the axis, so that when the rim is in place, there will be a constant pressure upon it by the spokes outward, thereby keeping the rim at all times taut, and preventing any slack or lost motion of these parts. In order to increase the resiliency of this felly, it is preferably in the form of a chain composed of a plurality of links 9, which links are attached together pivotally, as shown, by points 10, or by other means. At or near its middle point, preferably each link is set upon the end of one of its spokes 7, the end of the spoke being received in a socket 11 on the inner face of the link for this purpose, as indicated most clearly in Fig. 1.

From the construction described, it should be understood that the bars 5, where they project beyond the hub, form a cylindrical cage, and in the end of this cage, at or near the plane of the felly of the wheel, I provide a block 12. This block is of substantially circular form, as indicated in Fig. 1, the periphery of the said block being formed with longitudinal grooves 13, which receive the bars 5, as shown in Fig. 2. I prefer to form this block of some resilient material, such as rubber.

The pressure of the bars upon the block is sufficient to hold the same in position when in use, it being understood that the block will be forced into position, the block being slightly larger than the diameter of the cage, so that it tends somewhat to force the bars outward.

Near the outer end of the hub 3 I provide an encircling band 14, which extends around the bars 5 and assists in holding them in position, as will be readily understood.

By the construction just described, a wheel of great resilience is produced, for it is obvious that the bars 5 are formed of resilient material, so that they operate as springs. With this understanding it will be evident that when obstructions or irregularities in the roadbed are encountered, no considerable shock is transmitted to the axle or to the body of the vehicle.

In one aspect the hub may be considered as comprising also the bars 5, so that the hub itself may be considered as a spring; moreover, the joints in the felly give the wheel at this point a very desirable flexibility or resilience.

In the operation of the wheel, in case of an upward distortion of the felly at the point where it rests upon the ground, the first effect is to produce an upward deflection in the lower horizontal members 5. These act upon the block 12 and press the same upwardly, and the upward movement of the block 12 is resisted by the horizontal members 5 on the upper side thereof. In this way the wheel is given great strength and peculiar advantages due to the presence of the block 12.

Having thus described my invention, I claim as new and desire to secure by Letters Patent:

1. A vehicle-wheel having a hub, a plurality of longitudinally disposed bars attached to said hub and extending therebeyond, a member received between said bars at a point removed from said hub, and a felly attached to said bars, near the plane of the outer extremities thereof.

2. A wheel comprising a hub having a plurality of bars attached thereto and extending beyond the end of said hub, said bars having lateral extensions disposed substantially radially from the axis of said wheel, whereby they constitute spokes, a felly attached to the end of said spokes, and a resilient block received between the said bars and reinforcing the same.

3. A wheel comprising a hub having a plurality of bars attached thereto and extending beyond the end thereof, said bars having radial extensions, whereby they constitute spokes, a felly attached to said radial extensions, and a resilient block disposed between said bars and having grooves in the edge thereof, receiving said bars.

4. A wheel comprising a hub having a plurality of longitudinally-extending bars, projecting beyond the end thereof and forming a cage, said bars having radial extensions constituting spokes, a felly consisting of a plurality of jointed links attached to said spokes, and a resilient block received in said cage.

5. A wheel comprising a hub having a plurality of bars attached to the outer face thereof and extending longitudinally beyond the end of said hub to form a cage, said bars having radial extensions whereby they constitute spokes, a felly consisting of a plurality of links joined together, said links being mounted respectively upon said spokes, and a resilient block received in the end of said cage and having grooves in the periphery thereof, respectively receiving said bars.

In testimony whereof I have signed my name to this specification in the presence of two subscribing witnesses.

GEORGE RAINEY WILLIAMS.

Witnesses:
C. L. SAMPSON,
FRANK WITTENBERG.